Jan. 4, 1938.    W. A. HARRIS    2,104,384
METHOD OF MANUFACTURING ROOFING ELEMENTS

Filed July 25, 1936

WILLIAM A. HARRIS
INVENTOR

BY R. J. Dearborn

ATTORNEY

Patented Jan. 4, 1938

2,104,384

UNITED STATES PATENT OFFICE 2,104,384

METHOD OF MANUFACTURING ROOFING ELEMENTS

William A. Harris, Oreland, Pa., assignor to The Texas Company, New York, N. Y., a corporation of Delaware Application July 25, 1936, Serial No. 92,475

4 Claims. (Cl. 91—68)

This invention relates to roofing elements and to a method of manufacturing such elements either in the form of roofing shingles or sheet material.

It is more or less general practice in the roofing industry, particularly in connection with the manufacture of thick butt individual or strip shingles, to apply to a prepared base material, such as saturated felt, one or more coatings of a waterproof material, such as asphalt. As each successive coating of asphalt is applied to the base material it receives a thin surface coating of fine granular or flake-like material, so that when more than one coating of asphalt is applied the successive coatings are separated one from the other by the intervening layer of granular or flaky material. The presence of the granular or flaky material, some of which may be loose or dusty, provides in effect a line of cleavage between the adjacent coatings of asphalt and makes it more difficult to obtain a secure bond between successive coatings.

Figure 2:
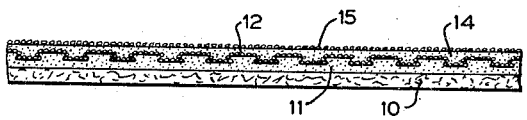

My invention contemplates the manufacture of sheet roofing material or individual or strip shingles by the application of a plurality of separate coatings of asphalt to a prepared base material and the application of granular material to the surface of each separate coating of asphalt. In order to obtain a positive bond between the successive coatings of asphalt the invention contemplates the furrowing of each coated surface before superimposing another coating of asphalt, and then applying sufficient pressure to the exposed surface to force asphalt into the furrows to contact and adhere to all of the exposed surfaces in the underlying coating caused by the furrowing thereof, and to flatten them slightly thereby producing definite keys, as shown in Fig. 2.

It is a further object of my invention to provide a method of manufacturing roofing sheets and individual and strip shingles wherein successive coatings of asphalt applied to the base material are positively bonded one to the other to increase the strength of the composite shingle or sheet.

Another object of my invention is to provide a method of manufacturing roofing sheets and individual and strip shingles in a continuous manner, utilizing the heat of the superimposed coating and the pressure from the usual cooling drums to effect a positive keying together of adjacent coatings of asphalt.

Figure 1:
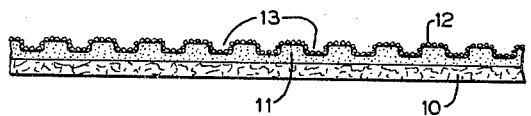

Other objects, features and advantages of my invention will appear as the description thereof progresses, and In Fig. 1 there is illustrated a transverse section through a sheet of saturated felt to which coatings of asphalt and granular material have been applied and in which furrows or keyways have been formed.

Fig. 2 is a transverse sectional view showing in somewhat exaggerated form two coatings of asphalt applied to a saturated felt base and separated by a coating of granular material, but keyed to each other.

In the drawing there is shown a width of saturated felt base material 10 to which has been applied a coating 11 of asphalt. A layer 12 of granular or flaky material such as natural slate granules or granular cork covers the exposed surface of the asphalt coating. The coating thus surfaced with granular material is then furrowed or scored as at 13 by passing the coated sheet in contact with a roll or rolls having serrated surface (not shown) or other suitable instrument capable of scoring or furrowing the coated surface. Furrows increase the area, separate the granules, and thus increase opportunity for contact of asphalt with asphalt. This operation may be performed at such point in the process of manufacture as is most appropriate with respect to the temperature of the coating.

The scoring or furrowing of the coated surface results in the creation of numerous keyways through which a second coating 14 of asphalt, which in turn has its surface coated with granular or flaky material 15, may be keyed or bonded securely to the underlying coating 11 of asphalt. The scoring or furrowing, which preferably but not necessarily extends longitudinally of the sheet, tends to break the continuity of the intervening layer of mineral surfacing material and permits asphalt from the upper coating 14 to contact and adhere to exposed surfaces of the asphalt in the underlying coating 11, and when the material so coated is passed over the usual cooling drums (not shown) sufficient pressure is exerted upon the sheet to effect a positive further bonding or keying together of the two asphalt coatings 11 and 14.

Obviously, many modifications and variations of the invention as herein set forth may be made without departing from the spirit and scope thereof, and therefore only such limitations should be imposed as are indicated in the appended claims.

I claim:

1. A method of manufacturing roofing material which comprises applying a coating of asphalt to one face of a sheet of prepared material, applying a layer of granular material over said coated face, scoring the surface of said sheet to form furrows therein and expose asphalt in the underlying coating, superimposing a second layer of asphalt upon the layer of granular material, and applying sufficient pressure to the coated surface to force asphalt from the superimposed coating through the furrows to contact and adhere to the asphalt in the underlying coating.

2. A method of manufacturing roofing material which comprises applying a coating of asphalt to one face of a sheet of prepared base material, applying a layer of mineral surfacing material over said coating of asphalt, scoring the surface of said sheet longitudinally thereof to form a plurality of furrows therein and to expose asphalt in the underlying coating of asphalt, superimposing a second layer of asphalt upon the scored surface of the sheet, and applying sufficient pressure to the coated surface to force asphalt from the superimposed coating through the furrows to contact and adhere to the asphalt in the underlying coating.

3. A method of manufacturing roofing material which comprises applying a coating of asphalt to one face of a sheet of prepared base material, applying a layer of granular material over said coated face, scoring the surface of said sheet to form furrows therein and expose asphalt in the underlying coating, superimposing a second layer of asphalt upon the layer of granular material, applying sufficient pressure to the coated surface to force asphalt from the superimposed coating through the furrows to contact and adhere to the asphalt in the underlying coating, and applying a layer of granular material over the surface of said second layer of asphalt.

4. A method of manufacturing roofing material which comprises applying a coating of asphalt to one face of a sheet of prepared base material, applying a layer of mineral surfacing material over said coating of asphalt, scoring the surface of said sheet longitudinally thereof to form a plurality of furrows therein and to expose asphalt in the underlying coating of asphalt, superimposing a second layer of asphalt upon the scored surface of the sheet, applying sufficient pressure to the coated surface to force asphalt from the superimposed coating through the furrows to contact and adhere to the asphalt in the underlying coating, and applying a layer of granular material over the surface of said second layer of asphalt.

WILLIAM A. HARRIS.